(12) United States Patent
Holowick

(10) Patent No.: US 6,755,148 B2
(45) Date of Patent: Jun. 29, 2004

(54) DUAL MAGNETIC REGISTER FOR A UTILITY METER

(75) Inventor: Erwin Holowick, Manitoba (CA)

(73) Assignee: Datamatic Ltd, Plano, TX (US)

( * ) Notice: Subject to any disclaimer, the term of this patent is extended or adjusted under 35 U.S.C. 154(b) by 218 days.

(21) Appl. No.: 09/999,431

(22) Filed: Nov. 15, 2001

(65) Prior Publication Data

US 2003/0089298 A1 May 15, 2003

(51) Int. Cl.[7] .............................. G01D 5/12; G01F 1/58
(52) U.S. Cl. .................... 116/204; 116/267; 73/861.77; 340/609; 340/688
(58) Field of Search ................................ 116/264, 204, 116/265, 267, 271, 273, 274, 285, 305, DIG. 6, DIG. 7; 73/861.77, 861.78; 340/609, 688, 606, 610, 618

(56) References Cited

U.S. PATENT DOCUMENTS

| | | | | |
|---|---|---|---|---|
| 4,089,220 A | * | 5/1978 | Houlberg ................. | 73/861.32 |
| 4,101,874 A | * | 7/1978 | Denison et al. ............. | 340/606 |
| 4,109,523 A | * | 8/1978 | Teyssandier ............. | 73/861.31 |
| 4,253,341 A | * | 3/1981 | Ikeda et al. .............. | 73/861.77 |
| 4,345,480 A | * | 8/1982 | Basham et al. .......... | 73/861.77 |
| 4,495,823 A | * | 1/1985 | Rosaen .................... | 73/861.76 |
| 4,723,449 A | * | 2/1988 | Tiley ....................... | 73/861.17 |
| 6,437,697 B1 | * | 8/2002 | Caro .......................... | 340/618 |
| 2003/0028333 A1 | * | 2/2003 | Olson .......................... | 702/45 |

* cited by examiner

Primary Examiner—Diego Gutierrez
Assistant Examiner—R. Alexander Smith
(74) Attorney, Agent, or Firm—Jackson Walker LLP; Robert C. Klinger

(57) ABSTRACT

The present invention provides a device, system, and method for detecting and measuring the bi-directional flow of a fluid through a fluid meter, such as a household or business water meter. In one device embodiment the invention comprises a logical switch collar (12) disposed over an analog fluid meter (14) having a sweep-hand (18) with a magnet (16) coupled thereto. In operation, the logical switch collar (12) consists of at least two magnetic switches that are triggered to open or close in response to the rotational movement of the sweep-hand (18) as fluid flows through a fluid meter (14) in both the forward and reverse directions. These switching events are detected and recording by an electronic module (19). Advantageously, the present invention accurately monitors and records fluid consumption at predetermined intervals when the fluid flows through the meter in either direction (14).

26 Claims, 4 Drawing Sheets

Electrical configuration of magnetic switches

Switch states versus Time
(Magnet moving in forward direction)

Switch states versus Time
(Magnet moving in reverse direction)

DUAL MAGNETIC REGISTER FOR A UTILITY METER

FIELD OF THE INVENTION

The present invention generally relates to fluid meters, and, more particularly, to an apparatus and a system for monitoring the bi-directional flow of water flowing through a household water meter.

BACKGROUND OF THE INVENTION

Organizations that provide electricity and water to home or business users are typically referred to as "utilities." These utility companies bill their customers by applying price rates based on the quantities of product that the customer uses during a predetermined time period, generally a month. This monthly usage is measured by reading the consumption meter located at a service point, which is usually located at a point where the utility service line enters the customer's home, store, or plant. To determine water usage, for instance, the numerical differences between a meter reading at the start of the predetermined period and at the end of that period reveals the gallons of water used during the month. More importantly, utility companies perceive these meters as their "cash registers" and, as such, they spend considerable time and money trying to obtain accurate meter readings.

Generally, there have been two acceptable methods used by water utility companies for obtaining monthly meter readings. One method is known, generally, as an E.M.R. (Electronic Meter Reading) method wherein a person (i.e., a meter reader) in the field uses a rugged hand held computer and visually enters the numerical reading displayed on the meter. Another method involves AMR (Automated Meter Reading), which simplifies meter reading by using a device that attaches to the meter and obtains a reading which is then transmitted to a remote location for processing via radio frequency (RF), telephone, or coaxial cable line carriers.

In order to measure their customer's daily, weekly, or monthly water consumption, water utility companies use three types of meters: standard meters, electronic pulse meters, and encoded register meters. However, in certain installations, these meters have no devices that measure water flowing in a backward direction (i.e., backflow) through the meters. Typically, this backflow causes the reading on the meter to decrement thereby producing less than accurate numerical readings and water consumption estimates, which reduces the utilities revenue.

Accordingly, there exists a need for an apparatus and system that detects and measures both the forward and reverse flow of water through a water meter and alerting the utility company thereof of a reverse flow condition.

SUMMARY OF THE INVENTION

The present invention achieves the technical advantage by sensing both the forward and reverse flow of water through a water meter and recording the occurrence thereof.

In one embodiment, the invention is a fluid detection system adapted to detect the bi-directional flow of a fluid flowing through a fluid meter. Preferably, the system comprises a sensing circuit adapted to be coupled to the meter for sensing and measuring the quantity of fluid that flows through the meter as it flows in a first direction and a second opposite direction. The system also comprises an electronics module which is communicably coupled to sensing circuit for detecting and recording, at predetermined intervals, the number times in which the fluid meter hand sweeps in the first direction and the second opposite direction.

In another embodiment, the invention is a device coupled to a water meter for accurately detecting water consumption. Preferably, the water meter is an odometer-type meter having a rotating sweeping hand having a magnet disposed thereon. The device comprises at least two magnetic switches adapted to sense the passing of the sweeping hand and to provide a first and second output signal in response to water flowing through the meter in a first direction and a second opposite direction, respectively. The device further comprises an electronic module having at least two inputs for receiving the first and second switching output signals. Advantageously, the electronic module tracks and records the flow of water in the first direction and the second opposite direction through the meter, at predetermined intervals, based on the on and off status of the first and second output signals.

In yet another embodiment, the invention is a method for sensing and recording the bi-directional flow of water through a water meter. This method is achieved by the acts of sensing water moving through a water meter, measuring the quantity of water passing through a water meter, and recording, at predetermined intervals, the number of times a meter hand sweeps in a forward and reverse direction.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE PREFERRED EMBODIMENTS

The numerous innovative teachings of the present application will be described with particular reference to the presently preferred exemplary embodiments. However, it should be understood that this class of embodiments provides only a few examples of the many advantageous uses and innovative teachings herein. Moreover, some statements may apply to some inventive features, but not to others.

Figure 1:
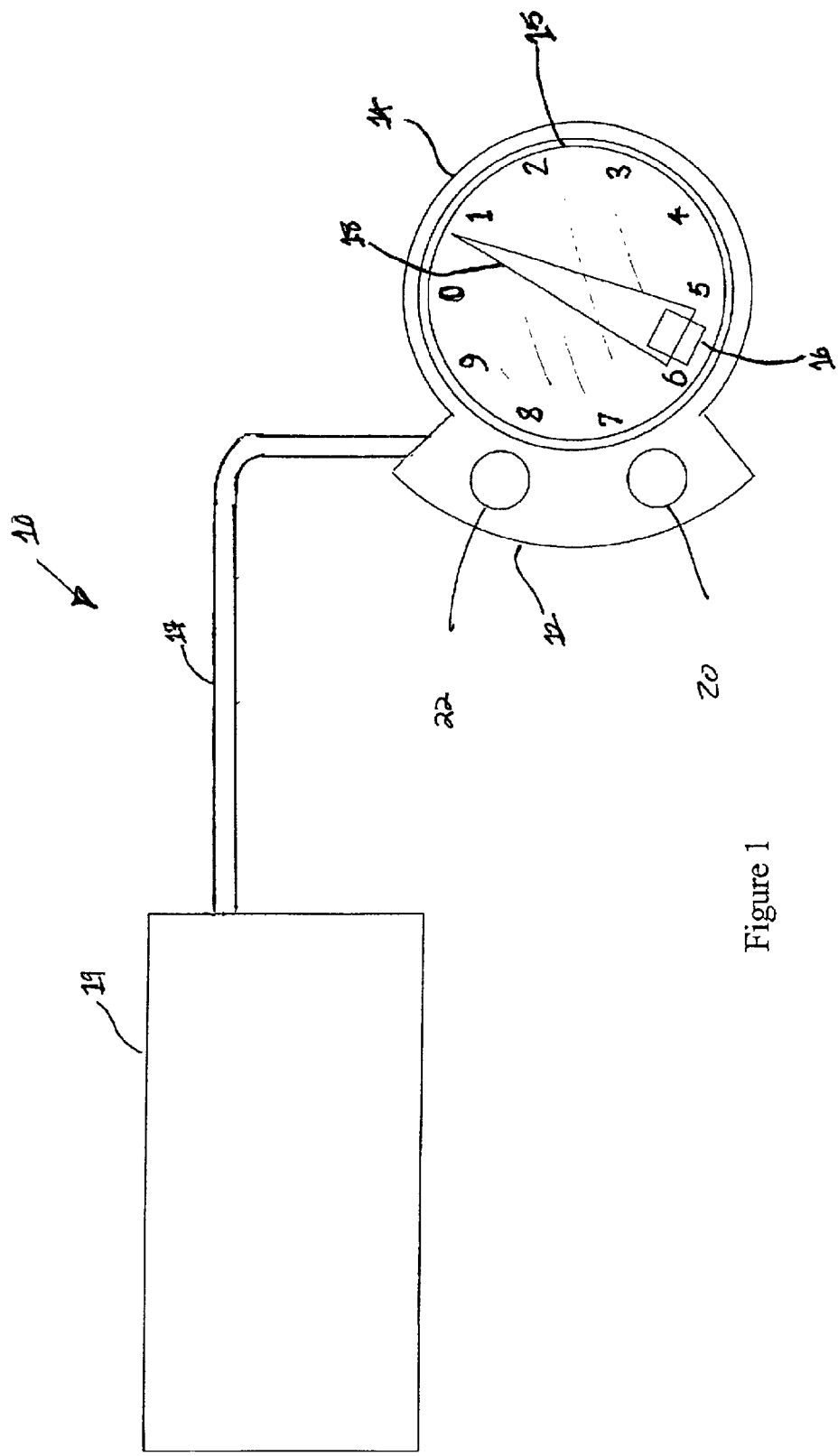
FIG. 1 shows a bi-directional water measuring system coupled to a water meter in accordance with the present invention.

FIG. 1 shows a bi-directional water measuring system 10 in accordance with the present invention. The system comprises a logical switch collar 12 coupled to a household or business water meter 14. In one preferred embodiment, the logical switch collar 12 is shown to be appropriately fitted over the perimeter lens of 15 of the meter 14, having a magnet 16 attached to a sweep-hand 18. Moreover, a microprocessor based electronic module 19 having memory is shown to be communicably coupled to logic switch collar 12 via cable 17.

In operation, the sweep-hand 18 turns clockwise as water passes forward through the meter 14, and sweeps counterclockwise as water passes in the reverse direction through meter 14. Typically one sweep, or rotation, of sweep-hand 18 signifies ten gallons of water flow i.e. consumption, for example. The magnet 16 attached to one end of the sweep-hand 18 is positioned such that it travels around the outer circumference of the meter 14 proximate the lens 15, passing close to the logical switch collar 12. The magnetic sensitivity of the logical switch collar's magnetic switches 20 and 22 and the strength of magnet 16 are coordinated to ensure proper operational overlap, as will be discussed shortly in reference to FIG. 2. As such, by tracking the number of sweeps of hand 18, in either direction, and distinguishing the sweep direction, and accounting for the sweep constant in gallons, the electronic module 19, in conjunction with the switch collar 12, accurately tracks and records into memory water consumption of water flowing in both the forward and reverse directions as it flows through the meter 14. It should be noted, however, that although the invention is used to monitor and record the bi-directional flow of water, any number of other liquids flowing through a meter may be detected and recorded, such as oil, for instance. In addition, although an odometer-type analog meter is illustrated, many types of analog meters may be fitted. For a more detailed description of the electronic module 19, cross-reference is made to commonly assigned co-pending U.S. patent application Ser. No. 09/896,502 entitled "Optical Sensor for Utility Meter", the teachings of which are incorporated herein be reference.

Figure 2:
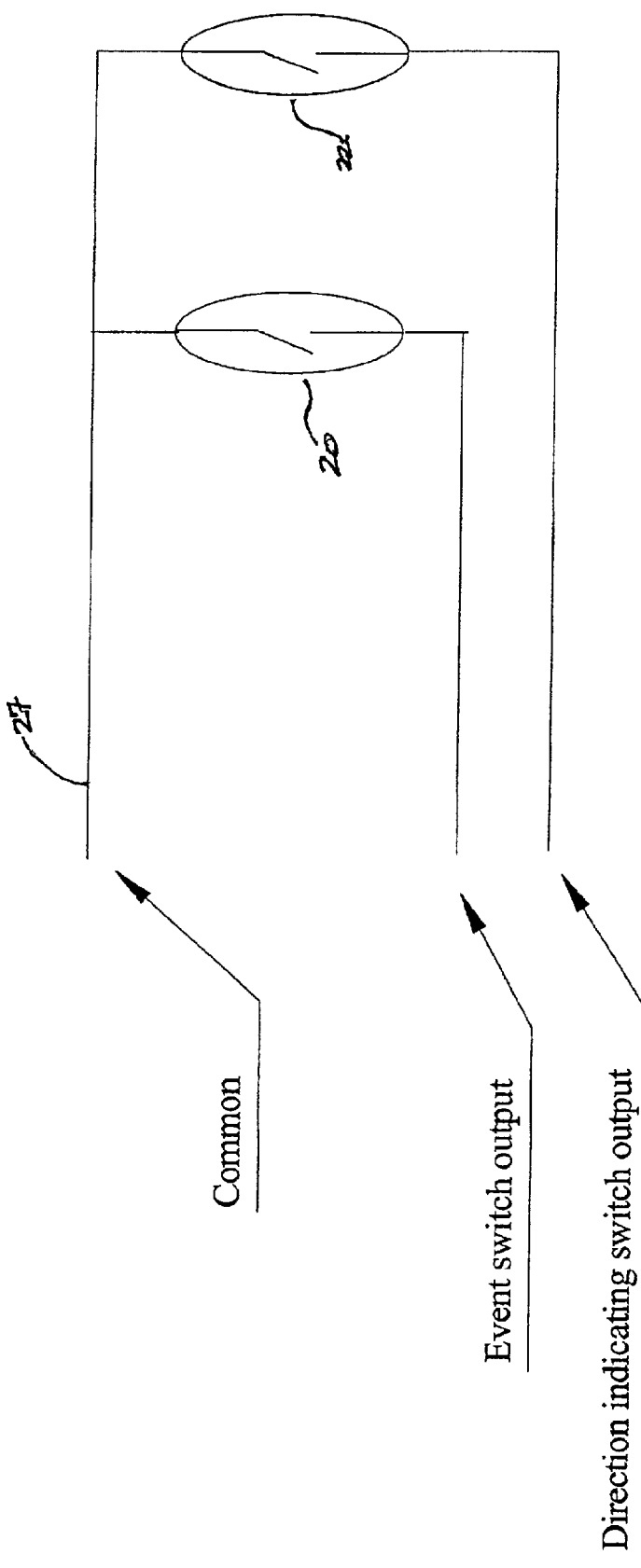
FIG. 2 shows an electrical configuration of two sensing switches in accordance with the present invention.

FIG. 2 shows an electrical configuration of the logical switch collar 12 in accordance with the present invention. The logical switch collar 12 has two magnetic switches mounted therein, an event switch 20 and a direction switch 22 which are adapted to generate two logic outputs. The switch collar 12 has a cable 17 coupled thereto, including wiring coupled to event switch 20 and direction switch 22, as well as common line 25. Depending on the direction of the flow of water through meter 14, switches 20 and 22 magnetically sense the directional passing of magnet 16 as the sweep-hand 18 increments in the clockwise direction, or, conversely, as it decrements in the counterclockwise direction, as depicted in FIG. 1. That is, magnet 16 triggers each of switches 20 and 22 to either an on or off state as a function of water flowing in the forward or reverse directions through the meter 14. As a result, the electronic module 19 detects and records these switching events as they are transmitted from switch collar 12 via cable 17. It should be understood that even though switches 20 and 22 are illustrated, different types of sensors or switches may be used, such as a dry contact switch, a transistor switch, or an optical switch, for example.

Figure 3:
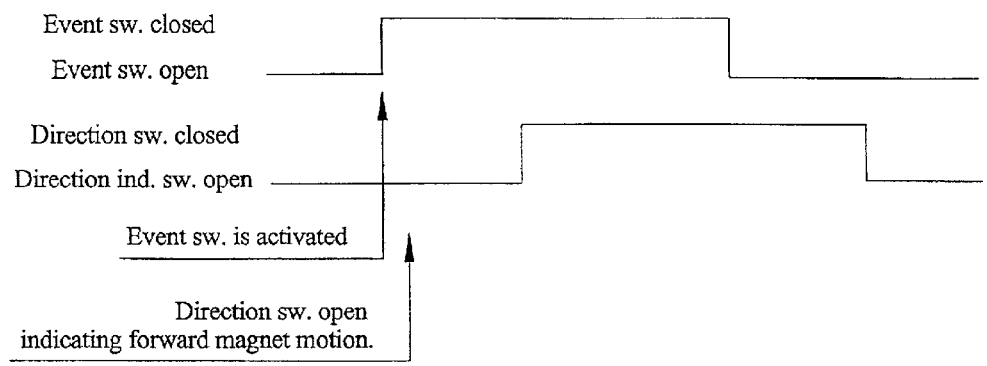
FIG. 3 is a switching diagram indicating the status of two magnetic switches when water flows in the forward direction through the water meter.

Referring now to FIG. 3, there is shown a timing switching diagram indicating the status of event switch 20 and direction indicator switch 22 as water flows in a forward direction. Again, as the magnet 16 sweeps clockwise across the face of the meter 14, it causes the event switch 20 to first close when the magnet is proximate the switch. The direction switch 22 will be open momentarily since the magnet 16 is approaching switch 22 clockwise, as shown, and water is determined to be flowing in the forward direction through the meter 14. The electronic module 19 in response to the closure of event switch 20 will record water as passing forward through the meter 14 as the meter reading is likewise incremented.

Figure 4:
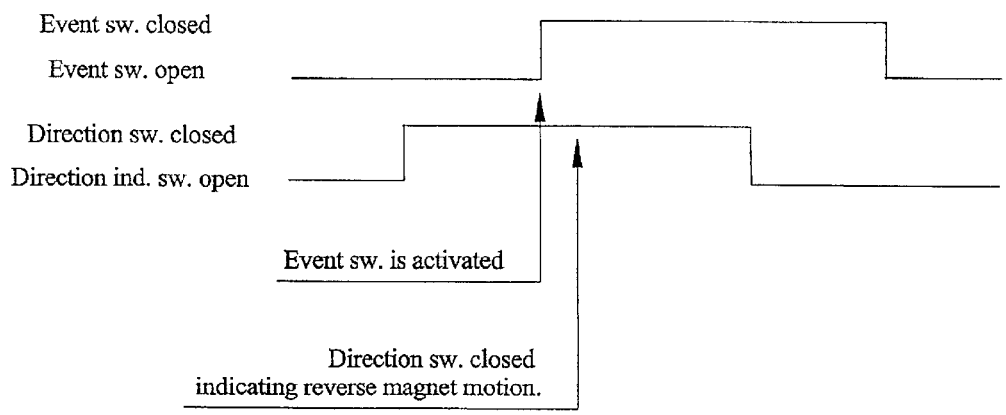
FIG. 4 is a switching diagram indicating the status of two magnetic sensing switches as water flows in the reverse direction through the water meter.

Alternatively, FIG. 4 shows a switching diagram indicating the status of switches 20 and 22 as water flows in the reverse direction. That is, at a time when the event switch 20 is closed by the proximity of magnet 16, the direction switch 22 is already closed due to the magnet 16 approaching from the counterclockwise direction, and water is established as flowing in the reverse direction, due to the sweep-hand 18 being rotated counterclockwise. Advantageously, the end result is that as the meter reading decrements, the electronic module 19 still accurately records the event of water passing through the meter 14 in the opposite direction by recording it as a reverse pass. The electronic module records the total gallons flowing forward, and backward through the meter, allowing for accurate billing.

Figure 5:
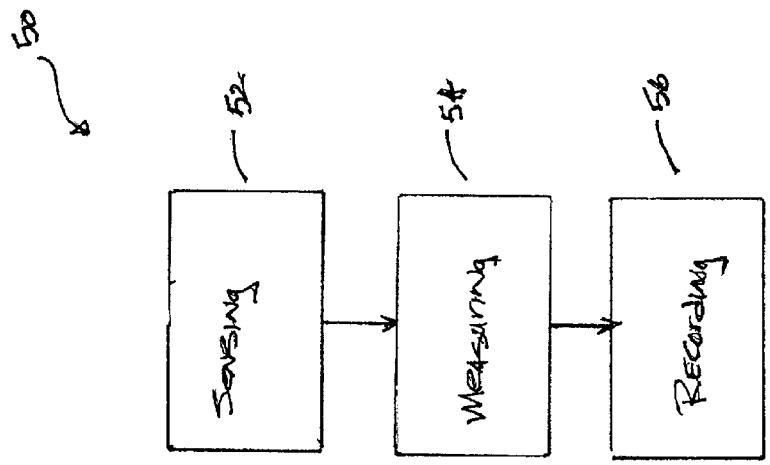
FIG. 5 illustrates a water detection and consumption algorithm.

FIG. 5 illustrates a flow diagram of a method for detecting water consumption according to the invention. The method, denoted generally as 50, involves a sensing act 52 that senses the direction of water flowing through a water meter 14. The sensing act 52 is then followed by a measuring act 54 which measures the quantity of water through the meter in view of the direction of flow being ascertained. Next, act 56, detects and records the quality of water flowing in both the forward and reveres directions through the meter 14.

Advantageously, the invention accurately monitors and records fluid consumption at predetermined intervals in both directions, rather than reporting the net water flow which inaccurately reports fluid flow events.

Though the invention has been described with respect to specific preferred embodiments, many variations and modifications will become apparent to those skilled in the art upon reading the present application. It is therefore the intention that the appended claims be interpreted as broadly as possible in view of the prior art to include all such variations and modifications.

I claim:

1. A remote monitoring device adapted to couple to and read visual indicator device of a fluid meter having at least one rotating member indicating a quantity of fluid passing through the fluid meter, the remote monitoring device comprising:

an electronic module accessory adapted to externally couple to and read the fluid meter indicator device, the electronic module distinguishing when the indicator device rotating member is rotating in the forward direction and the reverse direction, the electronic module accessory providing an electronic output indicative of the indicator device rotating member position and direction of rotation, wherein the electronic module accessory further includes a first sensing switch and a second sensing switch, wherein the rotating member triggers the first switch operating as an event detector at predetermined intervals in response to fluid flowing through the fluid meter.

2. The remote monitoring device of claim 1 wherein the rotating member comprises a rotating sweeping hand indicative of product flow and having a magnet coupled thereto.

3. The remote monitoring device of claim 2 wherein the first switch and the second switch each a comprise magnetic switch.

4. The remote monitoring device of claim 1 wherein the rotating member is adapted to rotate in a first direction in response to the fluid flowing in the forward direction through the fluid meter.

5. The remote monitoring device of claim 4 wherein the rotating member is adapted to rotate in the second opposite direction in response to the fluid flowing in the reverse direction through the fluid meter.

6. The remote monitoring device of claim 1 wherein the first switch is triggered in response to the rotating member passing a predetermined location.

7. The remote monitoring device of claim 6 wherein the second switch is triggered while the first switch is triggered to a first position in response to the fluid flowing in the forward direction, and triggers the second switch to a second position in response to the fluid flowing in the reverse direction.

8. The remote monitoring device of claim 1 wherein the fluid meter is a water meter, wherein the remote monitoring device is adapted to monitor the quantity of water flowing through the water meter.

9. In combination:
a fluid meter having a visual indicator device having at least one rotating member indicating a quantity of fluid passing through the fluid meter in a forward direction and a reverse direction; and
an electronic module accessory externally coupled to and reading the fluid meter indicator device, the electronic module distinguishing when the indicator device rotating member is rotating in the forward direction and the reverse direction, the electronic module accessory providing an electronic output indicative of the indicator device rotating member position and direction of rotation, wherein the electronic module accessory further includes a first sensing switch and a second sensing switch, wherein the rotating member triggers the first switch operating as an event detector at predetermined intervals in response to fluid flowing through the fluid meter.

10. The combination of claim 9 wherein the fluid meter rotating member has a magnet couple thereto.

11. The combination of claim 10 wherein the first switch and the second switch each comprise a magnetic switch.

12. The combination of claim 9 wherein the fluid meter rotating members is adapted to rotate in a first direction in response to the fluid flowing in the forward direction through the fluid meter.

13. The combination of claim 12 wherein the rotating member is adapted to rotate in the second opposite direction in response to the fluid flowing in the reverse direction through the fluid meter.

14. The combination of claim 9 wherein the rotating member triggers the second switch to a first position in response to the fluid flowing in the forward direction while the first switch is triggered.

15. The combination of claim 14 wherein the rotating member triggers the second switch to a second position in response to the fluid flowing in the reverse direction while the first switch is triggered.

16. A method of using an electronic module external to a fluid meter to ascertain a reading of the fluid meter having a visual indicator device having at least one rotating member indicating a quantity of fluid passing through the fluid meter in a forward and reverse direction, the electronic module further including a first sensing switch and a second sensing switch, wherein the rotating member triggers the first switch operating as an event detector at predetermined intervals in response to fluid flowing through the fluid meter, comprising the step of:
using the electronic module to externally detect the position of the fluid meter rotating member rotating in a forward and reverse direction.

17. The method of claim 16 wherein the fluid meter rotating member has a magnet coupled thereto.

18. The method of claim 17 wherein the first and second sensing switches each comprise a magnetic switch.

19. The method of claim 16 wherein the fluid meter rotating member is adapted to rotate in a first direction in response to the fluid flowing in the forward direction through the fluid meter.

20. The method of claim 19 wherein the fluid meter rotating member is adapted to rotate in a second opposite direction in response to the fluid flowing in the reverse direction through the fluid meter.

21. The method of claim 16 wherein the rotating member triggers the second switch to a first position in response to the fluid flowing in the forward direction while the first switch is triggered.

22. The method of claim 21 wherein the rotating member triggers the second switch to a second position in response to the fluid flowing in the reverse direction while the first switch is triggered.

23. A device for ascertaining product delivery adapted to externally couple to a fluid meter, wherein the fluid meter includes a visual rotating sweeping hand indicative of product flow, the device comprising:
a first switch adapted to generate a first signal in response to the sweeping hand passing a predetermined location;
a second switch adapted to generate a second signal indicative of a direction the sweeping hand is rotating while the first signal is generated; and
a recording module having at least two inputs, wherein the recording module, in response to the first and second signals, monitors and records product flowing in both a forward and a reverse direction through the fluid meter.

24. The device of claim 23 wherein the sweeping hand rotates in a counterclockwise direction in response to the product flowing in the reverse direction through the fluid meter.

25. The device of claim 24 wherein the sweeping hand rotates in a clockwise direction in response to the product flowing in the forward direction through the fluid meter.

26. The device of claim 23 wherein the first and second switches are magnetic switches.

* * * * *